J. F. PRITCHARD.
PEA AND BEAN SEPARATOR.
APPLICATION FILED MAY 21, 1917.

1,257,115.

Patented Feb. 19, 1918.
3 SHEETS—SHEET 1.

WITNESSES

INVENTOR
J. F. Pritchard
BY
ATTORNEYS

J. F. PRITCHARD.
PEA AND BEAN SEPARATOR.
APPLICATION FILED MAY 21, 1917.

1,257,115.

Patented Feb. 19, 1918.
3 SHEETS—SHEET 2.

WITNESSES

INVENTOR
J. F. Pritchard
BY
ATTORNEYS

J. F. PRITCHARD.
PEA AND BEAN SEPARATOR.
APPLICATION FILED MAY 21, 1917.
1,257,115.
Patented Feb. 19, 1918.
3 SHEETS—SHEET 3.
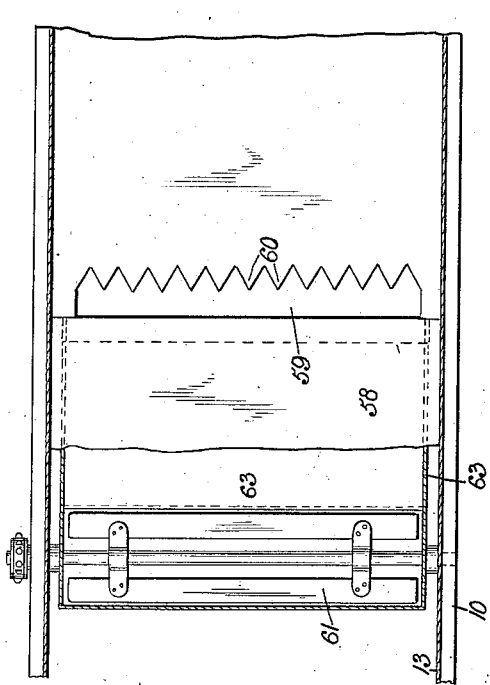
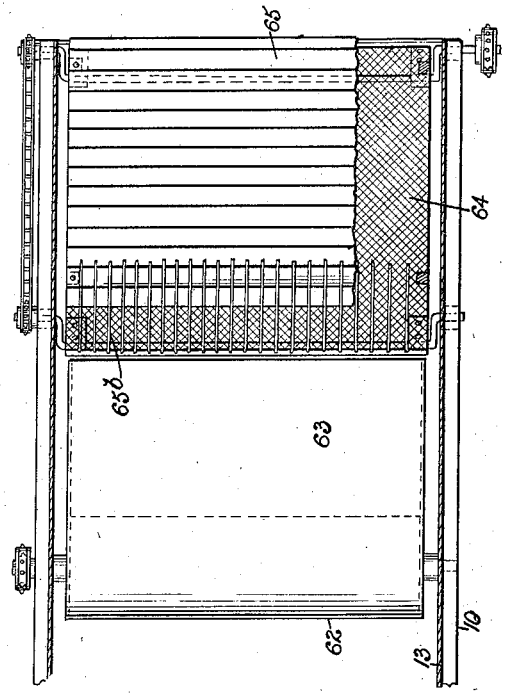
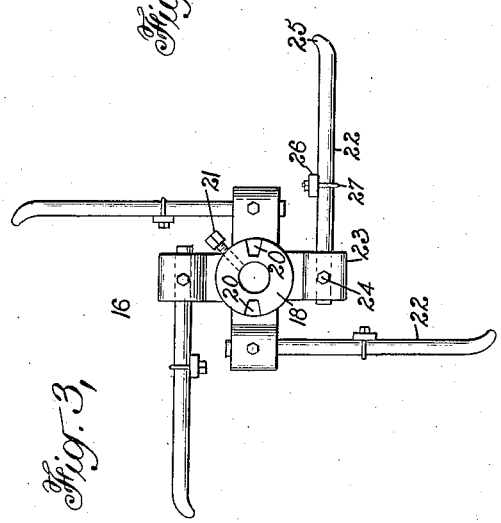
WITNESSES
INVENTOR
J. F. Pritchard
BY
ATTORNEYS

UNITED STATES PATENT OFFICE.

JOHNNIE FRANK PRITCHARD, OF ELIZABETH CITY, NORTH CAROLINA.

PEA AND BEAN SEPARATOR.

1,257,115.            Specification of Letters Patent.     Patented Feb. 19, 1918.

Application filed May 21, 1917. Serial No. 169,906.

*To all whom it may concern:*

Be it known that I, JOHNNIE F. PRITCHARD, a citizen of the United States, and a resident of Elizabeth City, in the county of Pasquotank and State of North Carolina, have invented a new and Improved Pea and Bean Separator, of which the following is a full, clear, and exact description.

My invention relates to a machine for harvesting and threshing peas or beans, of the type in which the machine is adapted to be drawn over a field and provided with suitable guide elements to direct the vines of a row properly to the machine, there being a beater revolving in the machine transversely to the direction of travel and arranged to strip and thresh the peas or beans, together with means to deliver the threshed peas or beans rearwardly to an elevator conveying the peas or beans and chaff to separating and screening devices.

An important object of my invention is to provide an improved beater or reel so constructed and arranged that the threshing arms or fingers thereon will enter between the vines or stalks and engage the same in a manner to minimize the scattering of the peas or beans on the ground before being directed rearwardly, the arrangement being such that the threshing fingers assume an almost perpendicular position before beginning the effective rearward stroke at the underside of the reel for directing the threshed peas or beans rearwardly into the machine.

A further object of the invention is to provide a reel capable of being readily applied to the thresher shaft of any pea or bean harvester in lieu of the ordinary reel or beater, and composed of sections each comprising a hub and finger, the sections having mating lugs and recesses or jogs so that a reel of given length may be readily built up to suit particular conditions.

My invention also has for its object to provide improved elevating, separating, and screening means for the threshed peas or beans.

The nature of my invention and the advantages of the various distinctive features thereof will be particularly explained in the specific description following.

Reference is to be had to the accompanying drawings forming a part of this specification in which similar reference characters indicate corresponding parts in all the views, it being understood that the drawings are merely illustrative of one example of the invention.

Fig. 3 is an end view of one of the reel sections;

Fig. 4 is a plan view thereof, parts being broken away;

Fig. 5 is a fragmentary section plan view on the line 5—5, Fig 1;

Fig. 6 is a similar view on the irregular line 6—6, Fig. 1.

Figure 1:
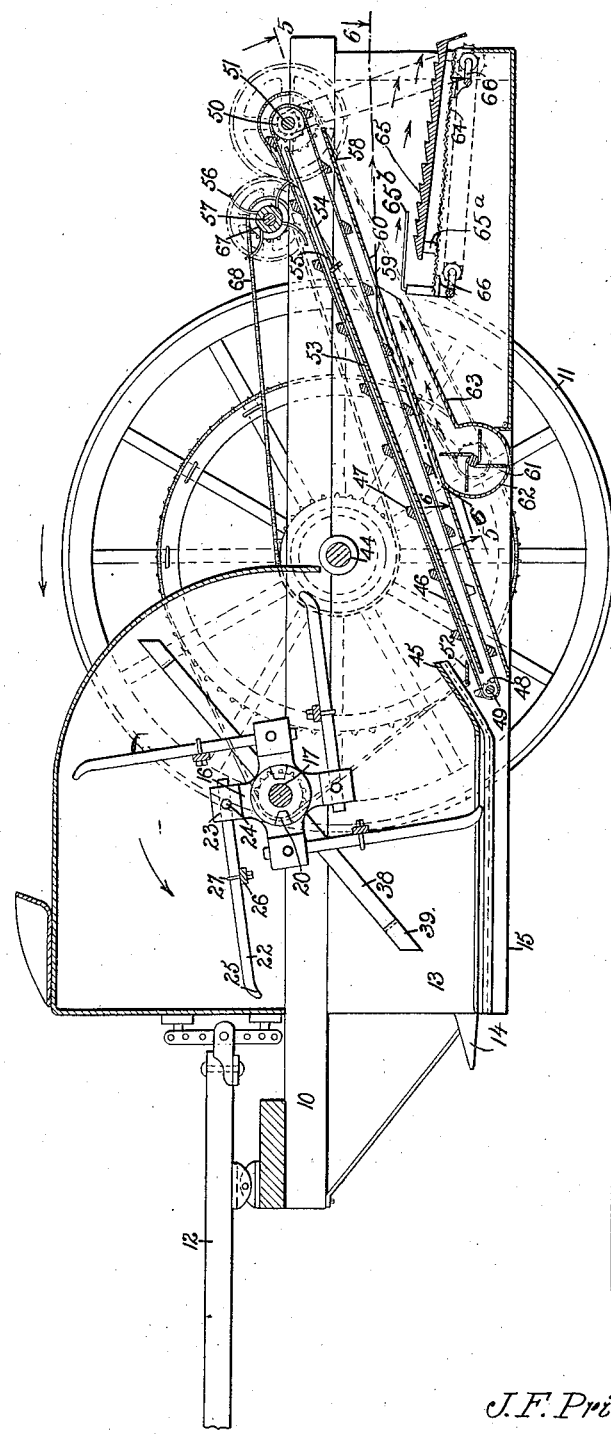
Figure 1 is a longitudinal vertical section of a harvester and thresher embodying my invention.

The illustrated practical embodiment of my invention includes a suitable frame 10 having running wheels 11 and a draft tongue 12. A box 13 is mounted on the frame, and at the bottom thereof, at the front, guides 14 project forwardly for directing the vines or stalks of a row of peas or beans to a guide slot or longitudinal opening 15 which extends from the front of the box between said guides rearwardly. An example of a machine embodying the general features referred to is disclosed in the Patent, No. 1,117,904, granted to George E. Pritchard, November 17, 1914, which machine includes a beater or reel disposed transversely above the slot or opening 15 for engaging vines or stalks at the opening to thresh the peas or beans and to direct them rearwardly into the box 13.

I provide a reel or beater 16 of improved construction, said reel being made up of separate sections, each section including a hub 18, the respective hubs having mating projections 20 and recesses or jogs 19 at opposite sides thereof to interlock the sections with one another. The hub has a bore whereby the sections may be passed onto the drive shaft 17 and one or each of the sections may have a set screw 21 to hold the assembled sections in fixed relation to the shaft and to one another. On each section radial arms 23 are produced each arm having a bore to constitute a socket for the beater's arms or fingers 22. The sockets of the respective arms are approximately co-incident with a circular line described concentric with the axis of the hub so that the fingers 22 will be tangential to said circle. Set screws 24 are provided to secure the fingers in the sockets. The adjacent fingers 22 of the assembled reel sections are connected by transverse bars 26, suitably clamped to the fingers as by U-bolts 27. With the reel formed in sections as described a reel of any given length to suit particular conditions may be built up. It will be seen that the finger ends 25 curve laterally in the direction of revolution, the curved ends being integral with the fingers. The tangential arrangement of the fingers with their curved ends result in the fingers entering between the stalks or vines and engaging the same in a position approximately perpendicular to the bottom of the box. By thus causing the fingers to engage the stalks or vines while perpendicular and forward of a line drawn vertically through the axis of the reel, the force of the rearward stroke of the fingers exerted on the beans or peas minimizes the detachment of the peas or beans and the scattering of the same on the ground before being directed rearwardly. The engagement of the vines or stalks also is coincident with the maximum rearward speed of the fingers and thus while minimizing the scattering of the peas or beans, the effectiveness of the fingers in directing the peas or beans rearwardly is increased.

On the ends of the drive shaft 17 and therefore co-axial with the reel, rakes 38 are secured to turn with the reel, the rakes having suitable rake heads 39. The rakes may be similar to those shown in the patent above mentioned and as in said patent, the rakes are adapted to throw the threshed peas or beans and chaff from the box 10 at the sides of the reel, there being in practice as in the patent a trough at each side for the rakes to operate in and the bottom of the box is inclined from the center toward the troughs. A suitable clutch, or clutches 43, may be provided on the drive shaft 17.

The reel shaft 17 is driven in any suitable manner, there being shown a sprocket wheel 40 thereon driven by a belt 41 which runs also over a sprocket wheel 42 turning with a running wheel 11, said drive means being duplicated in the example shown at the respective sides of the machine. Thus, the reel turns with the turning of the main axle 44.

Figure 2:
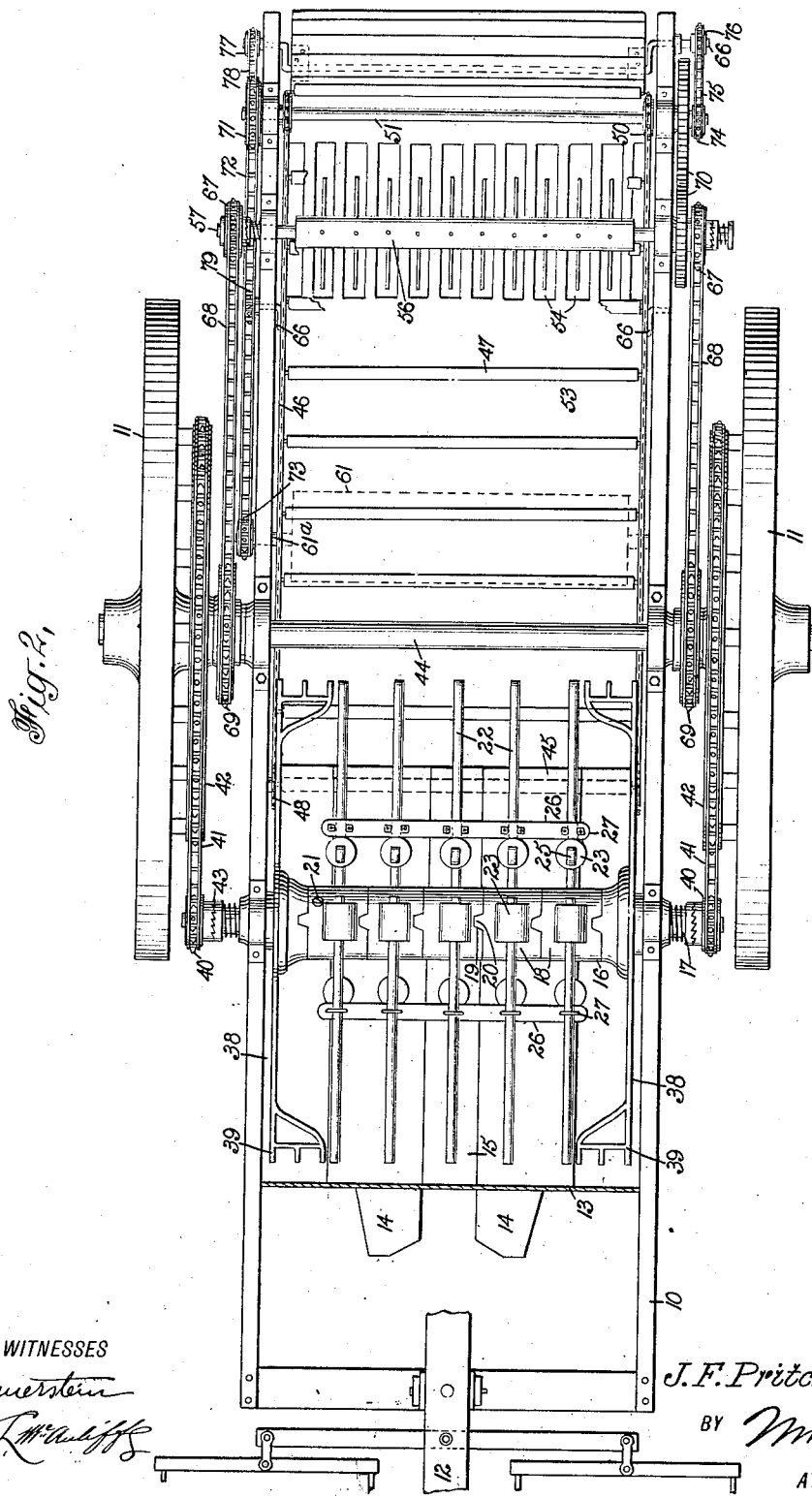
Fig. 2 is a plan view thereof.

The reel and rakes force the threshed material up an incline 45 in the rear thereof to a slatted traveling elevator or conveyer 46 consisting of side chains having slats 47. The elevator runs at the lower end over sprockets 48 on a transverse shaft 49 and at the upper end over sprockets 50 on a transverse shaft 51. The numeral 52 indicates a stop board hinged to the under side of the incline 45 or other fixed support to gravitate into the path of the slats 47 and act to prevent the material on the elevator running over the lower end of the elevator. The upper working run of the conveyer travels over a floor 53 which, as best shown in Fig. 2, is formed with a transverse series of longitudinal oblong openings 54 through which the elevated material may escape. The floor 53 is formed with downturned flanges 55 at the forward ends of the openings 54 as shown in Fig. 1 to act as a retarder, the retarder assisting in preventing the threshed material escaping through the openings 54, from being carried downwardly by the return run of the conveyer. A revolving wire brush 56 is mounted on a transverse shaft 57 adjacent to the upper end of the elevator and over the openings 54 to force the threshed material through the latter.

The return run of the conveyer 46 travels over the return board 58 which is formed with a transverse opening 59, best shown in Fig. 5, and said board at the rear edge of the opening 59 is formed with a transverse series of teeth 60 or equivalent interrupted edge whereby to better distribute the threshed material which it will be observed falls through the openings 54, and the under run of the slatted conveyer; to the running board to escape through the opening 59. The fan 61 of the machine turns in a casing 62 and the spout 63 extends rearwardly beneath the return board 58 to terminate adjacent to the opening 59 whereby to subject the material falling through said opening to the fan blast.

Also, beneath the return board 58 and rearward of the fan is a screen or riddle 64, above which, between the same and the return board, is a stepped blast board 65. The position of the blast board and riddle is such that the chaff and the peas or beans falling through the opening 59 will be subjected to the fan blast so that the chaff will be blown onto the blast board while the peas or beans fall onto the screen, the forward end of which overlaps or projects beyond the blast board, the forward end of which terminates at the opening 59. In order to vibrate the riddle and blast board in unison, they are rigidly connected as by uprights 65$^a$ or other means. A grid or series of fingers 65$^b$ on the screen in an elevated position at the receiving end serves to retard and break up the chaff if falling in a large amount and thereby makes for a more effective action of the fan blast on the chaff. The screen or riddle 64 is mounted at the ends thereof on crank shafts 66.

The driving means to actuate the various movable features relating to the elevated separator is preferably arranged as in the illustrated construction. On the brush shaft 57 a sprocket wheel 67 is mounted at either or both ends of the shaft, and a chain 68 runs over each sprocket wheel, and a sprocket wheel 69 on the axle 64. Intermeshing gear wheels 70 are provided on the brush shaft 57 and on the upper elevator shaft 51, at one end of said shafts. On the other end of the shaft 51 a sprocket 71 is secured over which a chain 72 runs and runs over a sprocket wheel 73 on one end of fan shaft 61ª. On one end of the shaft 51 there is also secured a sprocket pinion 74 over which a chain 75 runs, said chain running also over a sprocket pinion 76 on the rear crank shaft 66 of the riddle. The opposite end of said crank shaft has a sprocket pinion 77 over which a chain 78 runs, the chain running also over a sprocket wheel 79 on the other crank shaft 66.

I wish to state in conclusion that although the illustrated example constitutes a practical embodiment of my invention, I do not limit myself strictly to the mechanical details herein illustrated, since manifestly the same can be considerably varied without departure from the spirit of my invention as defined in the appended claims.

Having thus described my invention, I claim as new, and desire to secure by Letters Patent:

1. In a separator, a slatted elevator, a floor over which the upper working run of the elevator travels, said floor having openings for the escape of the grain and chaff, a return board down which the return run of the elevator travels, said return board having an opening at its upper end, in vertical line with the floor openings for the escape of material passing through the latter, and formed with a forwardly projecting series of teeth at the upper edge of the said opening in the return board to distribute the material, a fan having its spout arranged to deliver its fan blast rearwardly to the return board at the forward side of the opening therein, a stepped blast board below the return board rearward of the said opening, a riddle beneath the blast board, and means to vibrate said blast board and riddle in unison.

2. In a separator, a slatted conveyer, a floor over which the upper working run of the conveyer travels, said floor being open near its rear end for the escape of the grain and chaff from the conveyer, a return board beneath the said floor over which the return run of the conveyer travels, said return board having a transversely disposed opening near its rear end in vertical register with the open portion of said floor for the escape of grain and chaff passing through the said floor, a fan having its spout arranged to deliver the fan blast rearwardly beneath the return board at the forward side of the opening therein, and separating means below said return board and adapted to have the threshed material delivered thereto by the fan blast.

3. In a separator, a fan having its spout disposed toward the rear of the separator, means to cause grain and chaff to drop in front of the fan spout, a vibratable screen rearward of the fan spout and having its forward end positioned for the grain to drop directly thereon, a stepped blast board rigid with the screen to be vibrated in unison therewith, the said blast board terminating at its forward end rearward of the receiving end of the screen to permit the direct dropping of the grain to the latter, and to itself receive the chaff from the fan blast, a grid above the receiving end of the screen and rearward of the fan, and means to vibrate the screen, blast board, and grid in unison.

JOHNNIE FRANK PRITCHARD.